US011412663B2

(12) United States Patent
Monbaliu

(10) Patent No.: US 11,412,663 B2
(45) Date of Patent: Aug. 16, 2022

(54) RECTANGULAR BALER HAVING A WALL POSITIONING SYSTEM AND WALL POSITIONING METHOD

(71) Applicant: CNH Industrial America LLC, New Holland, PA (US)

(72) Inventor: Sven Monbaliu, Zuienkerke (BE)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 15/744,821

(22) PCT Filed: Jul. 7, 2016

(86) PCT No.: PCT/EP2016/066203
§ 371 (c)(1),
(2) Date: Jan. 14, 2018

(87) PCT Pub. No.: WO2017/009194
PCT Pub. Date: Jan. 19, 2017

(65) Prior Publication Data
US 2018/0199516 A1  Jul. 19, 2018

(30) Foreign Application Priority Data

Jul. 14, 2015 (BE) .................................. 2015/5450

(51) Int. Cl.
*A01F 15/08* (2006.01)
*B30B 9/30* (2006.01)

(52) U.S. Cl.
CPC ...... *A01F 15/0825* (2013.01); *A01F 15/0841* (2013.01); *B30B 9/3007* (2013.01)

(58) Field of Classification Search
CPC . A01F 15/0841; A01F 15/0825; B30B 9/3007
USPC ........................................................ 100/179
See application file for complete search history.

(56) References Cited

U.S. PATENT DOCUMENTS

| 1,508,433 | A | 9/1924 | Woulf |
| 2,699,107 | A | 1/1955 | Strauss |
| 3,070,006 | A | 12/1962 | Raney et al. |
| 4,354,430 | A | 10/1982 | Horiuchi |

(Continued)

FOREIGN PATENT DOCUMENTS

| DE | 287188 A5 | 2/1991 |
| EP | 1327385 A2 | 7/2003 |

(Continued)

*Primary Examiner* — Jessica Cahill
*Assistant Examiner* — Mohammed S. Alawadi
(74) *Attorney, Agent, or Firm* — Patrick Sheldrake; Peter Zacharias

(57) ABSTRACT

A rectangular baler having a wall positioning system. The baler having a bale chamber which includes a plurality of walls including a movable wall section. The wall positioning system includes a positioner for moving the movable wall section from a first position to a second position. The positioner is configured for applying pressure to a first pressure point and to a second pressure point on the movable wall section such that the second position of the movable wall section is substantially parallel to the first position of the movable wall section. The first pressure point and the second pressure point are spaced apart along a longitudinal direction of the bale chamber.

14 Claims, 10 Drawing Sheets

(56) References Cited

U.S. PATENT DOCUMENTS

| | | | | |
|---|---|---|---|---|
| 4,489,648 | A | * | 12/1984 | Naaktgeboren ....... B30B 9/3025 100/191 |
| 4,750,418 | A | * | 6/1988 | Naaktgeboren ....... B30B 9/3025 100/192 |
| 4,788,901 | A | | 12/1988 | Klinner et al. |
| 4,791,865 | A | * | 12/1988 | Naaktgeboren ..... A01F 15/0825 100/188 R |
| 5,226,356 | A | * | 7/1993 | Schrag ................. B30B 9/3025 100/41 |
| 5,592,876 | A | | 1/1997 | Son |
| 7,975,607 | B2 | * | 7/2011 | Hoover ............... A01F 15/0825 100/191 |
| 8,635,951 | B2 | | 1/2014 | VanDamme |
| 8,807,024 | B2 | | 8/2014 | Bonte et al. |
| 2015/0272006 | A1 | | 10/2015 | Demon |

FOREIGN PATENT DOCUMENTS

| | | | |
|---|---|---|---|
| GB | 972562 A | 10/1964 | |
| WO | 2013178632 A1 | 12/2013 | |
| WO | WO-2013178632 A1 * | 12/2013 | ......... A01F 15/0825 |

* cited by examiner

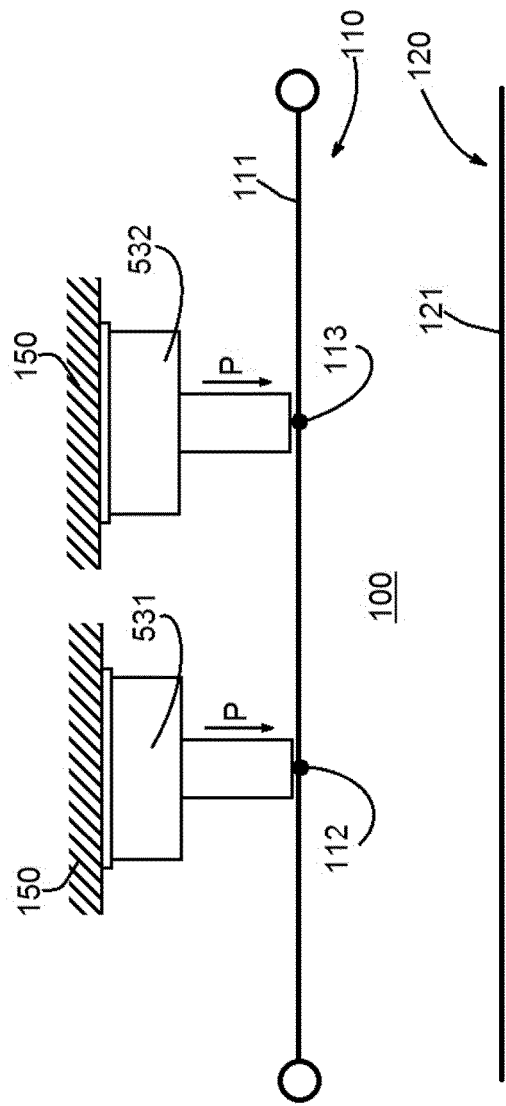

RECTANGULAR BALER HAVING A WALL POSITIONING SYSTEM AND WALL POSITIONING METHOD

FIELD OF INVENTION

The field of the invention relates to a rectangular baler having a wall positioning system and to a wall positioning method for a rectangular baler baler comprising a bale chamber which comprises a plurality of walls including a movable wall section.

BACKGROUND

Prior art rectangular balers have positioning means which are configured for pivotally moving a movable wall section of a bale chamber. When a large pressure is applied to the movable wall section, this typically results in a hard to control change of inclination angle of the movable wall section. Consequently, the cross section of the bale chamber may become narrower or broader towards the end. When the cross section becomes too narrow this could result in deformed bales, and when the cross section becomes broader the bales may unintentionally expand.

SUMMARY

The object of embodiments of the invention is to provide a rectangular baler having an improved wall positioning system and an improved wall positioning method for a rectangular baler.

According to a first aspect of the invention there is provided rectangular baler having a wall positioning system, the baler comprising a bale chamber which comprises a plurality of walls, including a movable wall section. The wall positioning system comprises positioning means for moving the movable wall section from a first position to a second position. The positioning means are configured for applying pressure to a first pressure point and to a second pressure point on the movable wall section such that the second position of the movable wall section is substantially parallel to the first position of the movable wall section. The first pressure point and the second pressure point are spaced apart along a longitudinal direction of the bale chamber.

Embodiments are based inter alia on the inventive insight that by applying pressure on two pressure points which are spaced apart along a longitudinal direction of the bale chamber, a more accurate positioning of the movable wall section can be obtained as compared to applying pressure on only one pressure point. This approach to move the movable wall section from a first position to a second position leads to a more accurate positioning of the movable wall section. By moving the movable wall section from a first position to a second position such that the second position of the movable wall section is substantially parallel to the first position of the movable wall section, it is possible to keep an angle of the movable wall section constant while increasing pressure within the bale chamber.

In exemplary embodiments of the invention, the movable wall section may be a movable top door, a movable side door, or a movable bottom door. The wall positioning may be performed for all movable doors or for a number of movable doors. In certain embodiments, the movement of e.g. two side doors may be mechanically or hydraulically coupled, in which case the wall positioning may be performed on only one side door, wherein the other side door automatically follows the first side door.

In a preferred embodiment the positioning means comprise actuator means for applying pressure to the first pressure point and coupling means for providing a coupling between the first pressure point and the second pressure point. The coupling means are configured for transferring pressure, which is applied to the first pressure point, to the second pressure point. This approach allows for an accurate movement of the top wall section by only actively applying pressure via the actuator means to one pressure point on the movable wall section. The coupling means are configured for transferring the actively applied pressure to the second pressure point, in such a way that an equal pressure is applied on both the first pressure point (actively by the actuator means) and the second pressure point (passively by the coupling means), which results in a translational movement of the movable wall section, wherein a starting position and ending position of the movable wall section are substantially parallel.

In a possible embodiment the coupling means may provide a mechanical coupling or an hydraulic coupling between the first and the second pressure point.

In a preferred embodiment, the coupling means comprise a rod, which is arranged substantially parallel to the movable wall section. The rod is, at a first end, hingedly connected to a frame of the baler and to a point on the movable wall section nearby the first pressure point. At a second end, the rod is hingedly connected to the frame of the baler and to the second pressure point. This approach allows for a simple mechanical coupling between the first pressure point and the second pressure point and for an accurate positioning of the movable wall section.

In an alternative embodiment, the coupling means comprise an actuator.

In an exemplary embodiment, the actuator means comprise a hydraulic cylinder which is attached to the frame of the baler and which is arranged substantially perpendicular to the movable wall section. The hydraulic cylinder is configured for applying pressure to the first pressure point.

In an embodiment, the wall positioning system comprises a controlling unit, which is configured for controlling the actuator means to move the movable wall section to the second position.

In a preferred embodiment, the positioning means comprise first actuator means for applying pressure to the first pressure point and second actuator means for applying pressure to the second pressure point. This way pressure is applied actively on both pressure points.

In an exemplary embodiment, the wall positioning system further comprises a controlling unit, which is configured for controlling the first actuator means and the second actuator means to move the movable wall section to the second position. This approach allows for controlling separately which amount of pressure is applied to the first pressure point and to the second pressure point.

In a preferred embodiment, the first actuator means are controlled to apply a certain pressure and the second actuator is configured to follow the first actuator by means of a hydraulic coupling.

In a preferred embodiment, the first actuator means comprise a first hydraulic cylinder, which is attached to the frame of the baler and arranged substantially perpendicular to the movable wall section. The first hydraulic cylinder is configured for applying pressure to the first pressure point. The second actuator means comprise a second hydraulic cylinder, which is attached to the frame of the baler and arranged substantially perpendicular to the movable wall section. The second hydraulic cylinder is configured for applying pressure to the second pressure point.

In a preferred embodiment, the first position of the movable wall section is substantially parallel to a wall section arranged opposite to the movable wall section.

According to another aspect of the invention, there is provided a rectangular baler comprising a wall positioning system according to any one of the preceding embodiments.

In a preferred embodiment, the rectangular baler comprises a bale chamber which comprises a bottom wall and a top wall. The top wall comprises a movable top wall section and a hinging top wall section. Seen in a longitudinal direction of the baler, a first end of said hinging top wall section is hingedly connected to a frame of the baler at a plunger end of the bale chamber. A second end of said hinging top wall section is hingedly connected to the movable top wall section, such that the top wall can have a slope discontinuity where the hinging top wall section is connected to the movable top wall section. The movable top wall section and hinging top wall section which are arranged in such a manner are said to form a so-called variable bend. The positioning means are configured for applying pressure to a first pressure point and to a second pressure point on the movable top wall section such that the second position of the movable top wall section is substantially parallel to the first position of the movable top wall section. The first pressure point and the second pressure point are spaced apart by a predetermined minimum distance along a longitudinal direction of the bale chamber.

In a further embodiment, the rectangular baler comprises a bale chamber which comprises a first side wall and a second side wall. The first side wall comprises a movable side wall section and a hinging side wall section. Seen in a longitudinal direction of the baler, a first end of said hinging side wall section is hingedly connected to a frame of the baler at a plunger end of the bale chamber. A second end of said hinging side wall section is hingedly connected to the movable side wall section, such that the first side wall can have a slope discontinuity where the hinging side wall section is connected to the movable side wall section. The movable side wall section and hinging side wall section which are arranged in such a manner are said to form a so-called variable bend. The positioning means are configured for applying pressure to a first pressure point and to a second pressure point on the movable side wall section such that the second position of the movable side wall section is substantially parallel to the first position of the movable side wall section. The first pressure point and the second pressure point are spaced apart along a longitudinal direction of the bale chamber.

The skilled person will understand that the hereinabove described technical considerations and advantages for system embodiments also apply to the below described method embodiments, mutatis mutandis.

According to yet another aspect of the invention there is provided a wall positioning method for a rectangular baler comprising a bale chamber which comprises a plurality of walls including a movable wall section. The wall positioning method comprises moving the movable wall section from a first position to a second position by applying pressure to a first pressure point and to a second pressure point on the movable wall section such that the second position of the movable wall section is substantially parallel to the first position of the movable wall section. The first pressure point and the second pressure point being spaced apart along a longitudinal direction of the bale chamber.

In an exemplary embodiment, moving the movable wall section from the first position to the second position comprises directly applying pressure to the first pressure point and providing a coupling means between the first pressure point and the second pressure point. It further comprises transferring pressure which is applied to the first pressure point to the second pressure point via said coupling means.

In a preferred embodiment, the coupling means comprise a rod which is arranged substantially parallel to the movable wall section. The rod is at a first end, hingedly connected to a frame of the baler and to a point on the movable wall section nearby the first pressure point. At a second end, the rod is hingedly connected to the frame of the baler and to the second pressure point.

In an exemplary embodiment, moving the movable wall section from the first position to the second position comprises directly applying pressure to the first pressure point and directly applying pressure to the second pressure point.

According to a preferred embodiment, the first position of the movable wall section is substantially parallel to a wall section arranged opposite to the movable wall section.

According to a further aspect of the invention, there is provided a computer program comprising computer-executable instructions to perform the method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 5 is a schematic drawing of a further exemplary embodiment of a wall positioning system for a rectangular baler, wherein the system actively applies pressure to two point on the movable wall section;

DESCRIPTION OF EMBODIMENTS

Figure 1:
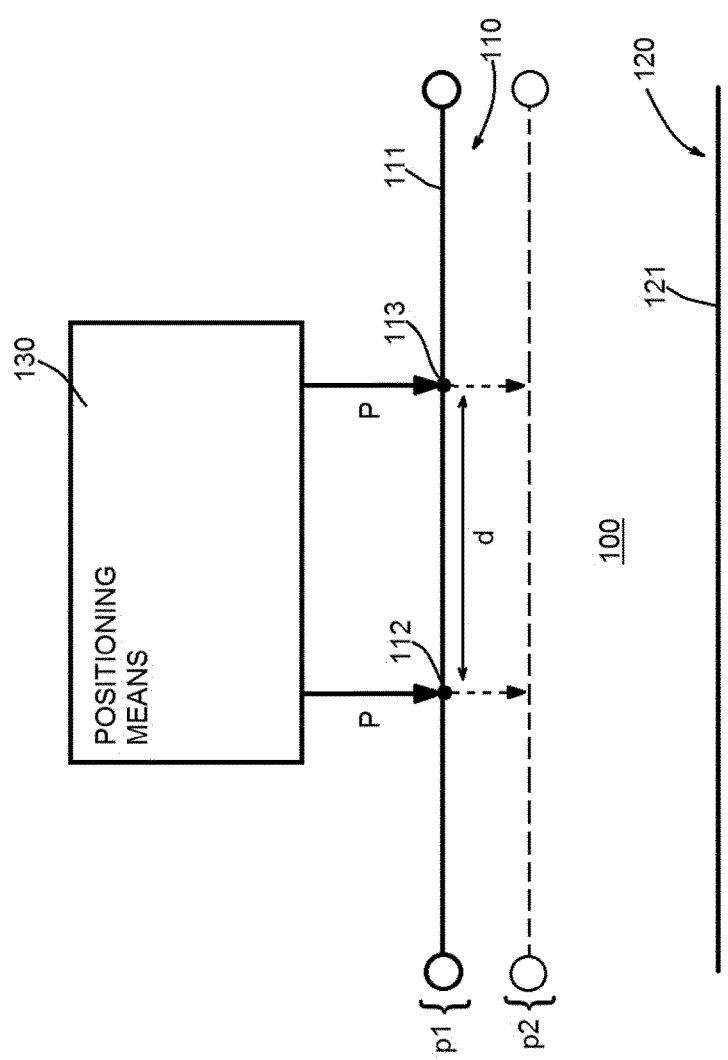
FIG. 1 is a schematic drawing of an exemplary embodiment of a wall positioning system for a rectangular baler.

FIG. 1 illustrates an exemplary embodiment of a wall positioning system for a rectangular baler comprising a bale chamber 100 which comprises a plurality of walls 110, 120 including a movable wall section 101 (see FIG. 3B), 111. The wall positioning system comprises positioning means 130 for moving the movable wall section between a first position (p1) where the movable wall sections are moved outside to create the largest cross section available in the bale chamber 100, and a second position (p2), where the movable wall sections are moved inwards to create the smallest possible cross section available in the bale chamber. The actual position of the movable wall sections depends on the amount of pressure P which needs to be applied to crop material in the baling chamber 100, such that a specific density of the bales can be reached. The positioning means 130 are configured for applying pressure P to a first pressure point 112 and to a second pressure point 113 on the movable wall section 111 such that the movable wall section 111 remains substantially parallel when moving between the first position (p1) and the second position (p2). In FIG. 1, the first pressure point 112 and the second pressure point 113 are spaced apart by a distance (d) along a longitudinal direction of the bale chamber. Preferably, there is a distance of approximately 2 m between the first pressure point 112 and the second pressure point 113.

However, the preferred distance may vary, depending on the dimensions of the baler and bale chamber 100.

For the sake of completeness it is mentioned that the left hand side in the drawings represents an entrance section of the bale chamber 100. Crop material is thus introduced by a plunger 180 (only shown in FIGS. 6A, 6B and 6C) in the bale chamber 100 at the left hand side. When crop material is forced through the bale chamber 100 and the positioning means 130 exert a force on the movable wall section 111, the movable wall section 111 is moved to the second position (p2) where it is pressed against the crop material and the formed bales in the bale chamber 100.

Although for the sake of simplicity the movable wall section 111 is depicted in the figures as a movable top wall section or top door, it should be clear to the skilled person that the movable wall section may be a movable top door 111, a movable side door 101, or a movable bottom door 121 and that the principles of the invention are readily applicable in either case. Also a combination of any of the movable doors is possible: the wall positioning may be performed for all movable doors or for a number of movable doors. In certain embodiments, the movement of e.g. two side doors may be mechanically or hydraulically coupled, in which case the wall positioning may be performed on only one side door, wherein the other side door automatically follows the first side door.

Figure 2:
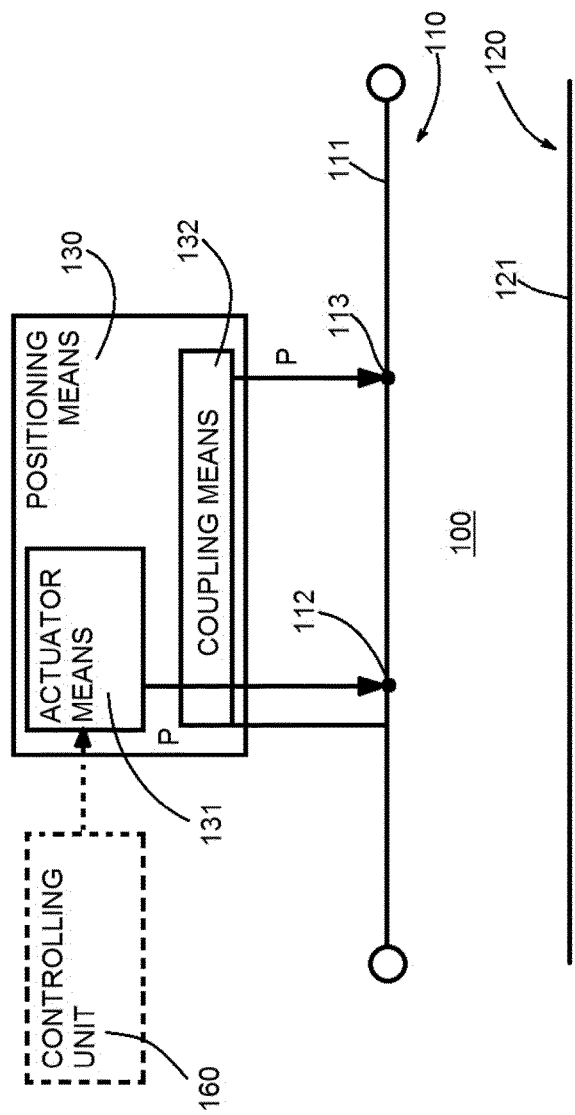
FIG. 2 is a schematic drawing of a further exemplary embodiment of a wall positioning system for a rectangular baler, wherein the system actively applies pressure to one point on the movable wall section and wherein coupling means transfer the applied pressure to a second point.

FIG. 2 illustrates an embodiment of a wall positioning system, wherein the positioning means 130 comprise actuator means 131 for applying pressure to the first pressure point 112 and coupling means 132 for providing a coupling between the first pressure point 112 and the second pressure point 113. The coupling means are configured for transferring pressure, which is applied to the first pressure point 112, to the second pressure point 113.

The wall positioning system can further comprise a controlling unit 160 which is configured for controlling the actuator means 131 to move the movable wall section 111 to the second position.

Figure 3A:
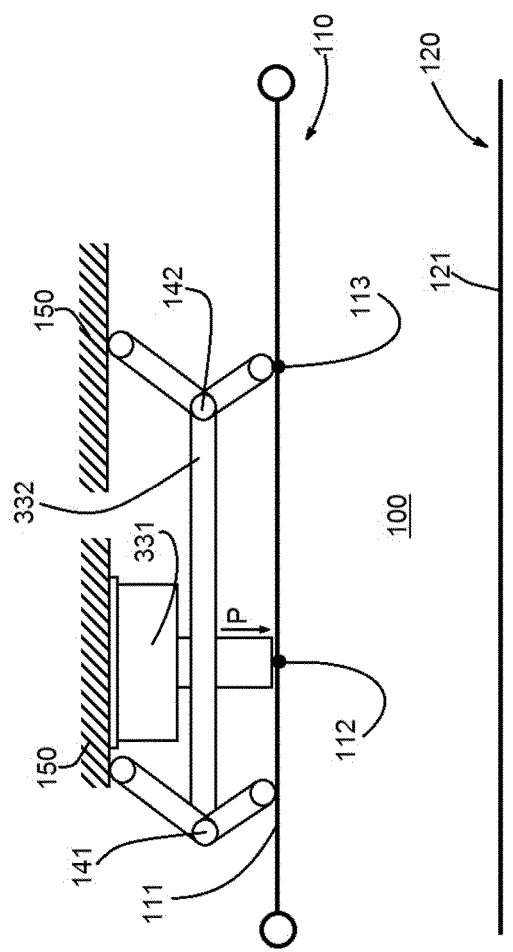
FIGS. 3A and 3B illustrate preferred exemplary embodiments of a wall positioning system for a rectangular baler and a baler respectively, wherein the system actively applies pressure to one point on the movable wall section and wherein a rod is arranged in such a way that the applied pressure is transferred to a second point on the movable wall section.
Figure 3B:
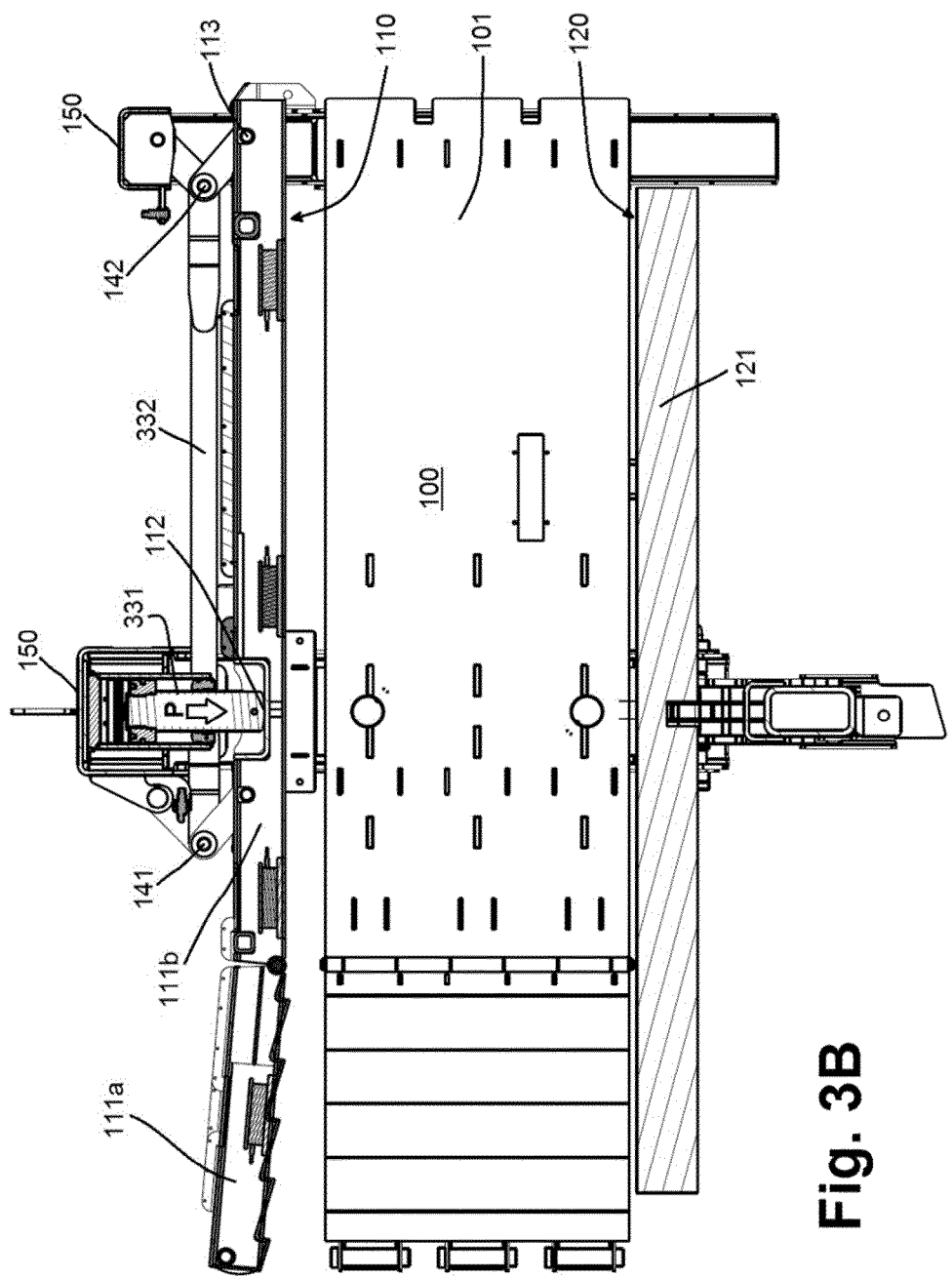

FIGS. 3A and 3B illustrate an embodiment of wall positioning system and a rectangular baler having a wall positioning system respectively, wherein the coupling means 132 comprise at least one rod 332 which is arranged substantially parallel to the movable wall section 111. The at least one rod 332 is, at a first end 141 hingedly connected to a frame 150 of the baler and to a point on the movable wall section nearby the first pressure point 112, and at a second end 142, hingedly connected to the frame 150 of the baler and to the second pressure point 113. At the first end 141, the at least one rod should be connected by a hinge to a point which is located in proximity of the first pressure point 112, such that when the actuator means 131, 331 press on the first pressure point 112 on the movable wall section 111 the movement of the wall section will cause the hinge connection at the first end 141 of the at least one rod 332 to expand. When the hinge connections at the first end 141 expand, they will cause the at least one rod 332 to be pushed in the direction of the second end 142 of the at least one rod 332. The movement of the at least one rod 332 will then cause the hinge connection on the second end 142 to expand and consequently cause them to press on the second pressure point 113 of the movable wall section 111. Although it is preferred to have the first end 141 of the at least one rod 332 hingedly connected to the frame 150 nearby the first pressure point 112, this connection to the frame 150 may be at any location within a holding zone delimited by section 111b. In this case, an additional structure may be needed to connect the at least one rod 332 to the frame 150.

According to a preferred embodiment, the actuator means 131 comprise a hydraulic cylinder 331 which is attached to the frame 150 of the baler and arranged substantially perpendicular to the movable wall section 111. The hydraulic cylinder 331 is configured for applying pressure to the first pressure point 112.

Figure 4:
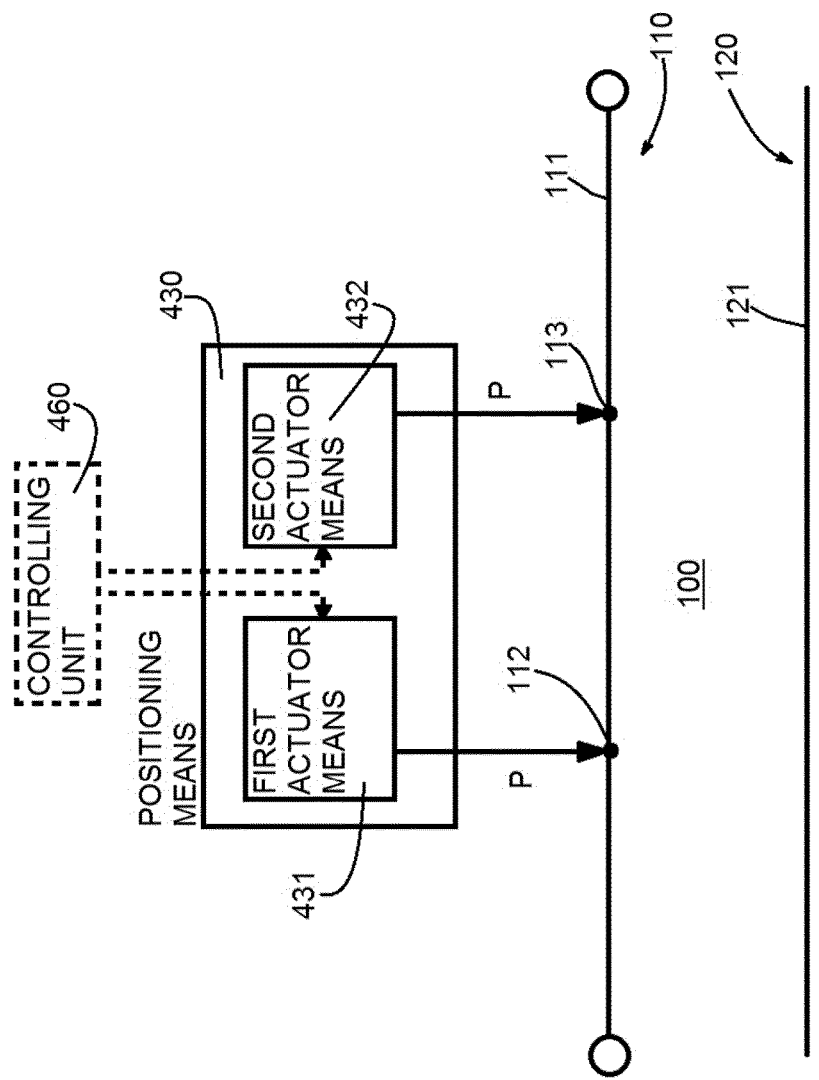
FIG. 4 is a schematic drawing of an exemplary embodiment of a wall positioning system for a rectangular baler, wherein the system actively applies pressure to two points on the movable wall section.

FIG. 4 illustrates an exemplary embodiment of a wall positioning system, wherein the positioning means 130, 430 comprise first actuator means 431 for applying pressure to the first pressure point 112 and second actuator means 432 for applying pressure to the second pressure point 113.

The wall positioning system can further comprise a controlling unit 460 which is configured for controlling the first actuator means 431 and the second actuator means 432 to move the movable wall section 111 between the first position (p1) and the second position (p2).

FIG. 5 illustrates a further embodiment of a wall positioning system wherein hydraulic cylinders are used as actuator means to apply pressure to the movable wall section. The first actuator means 431 comprise a first hydraulic cylinder 531 which is attached to the frame 150 of the baler and arranged substantially perpendicular to the movable wall section 111. The first hydraulic cylinder 531 is configured for applying pressure to the first pressure point 112. The second actuator means 432 comprise a second hydraulic cylinder 532 which is attached to the frame 150 of the baler and arranged substantially perpendicular to the movable wall section 111. The second hydraulic cylinder 532 is configured for applying pressure to the second pressure point 113.

In the embodiment illustrated in FIG. 5, the position of the movable wall section 111 is substantially parallel to a wall section 121 arranged opposite to the movable wall section 111.

Figure 6A:
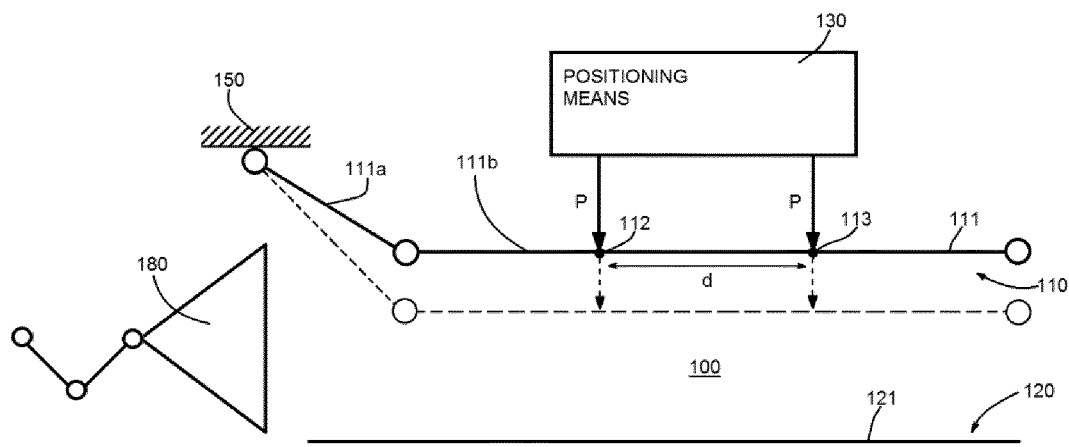
FIGS. 6A, 6B and 6C are schematic drawings of exemplary embodiments of a wall positioning system for a rectangular baler having a variable bend top wall.
Figure 6B:
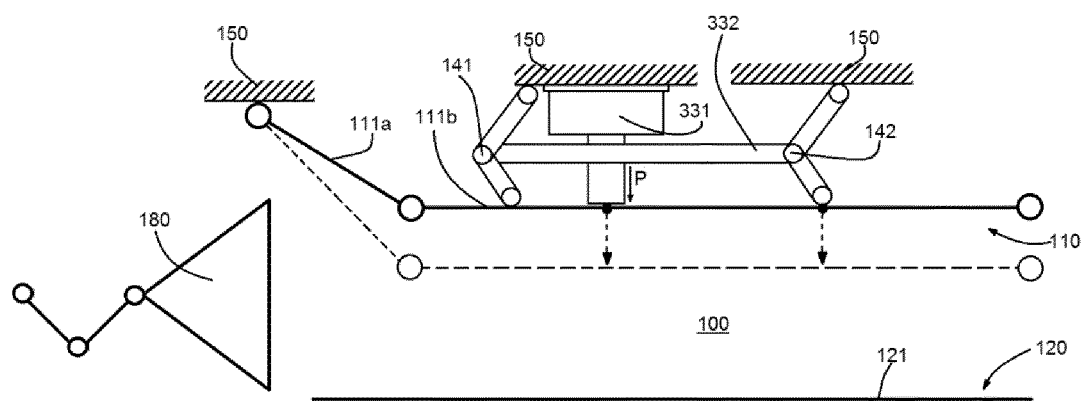
Figure 6C:
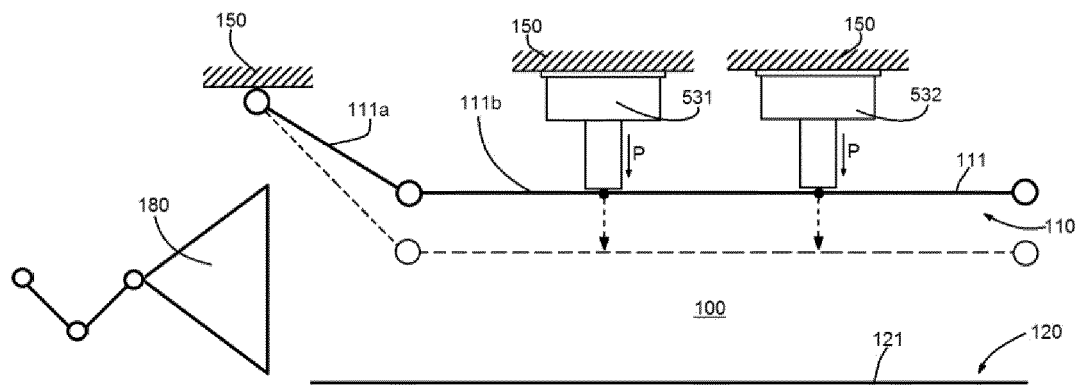

FIGS. 6A, 6B and 6C each illustrate a part of a rectangular baler comprising a wall positioning system according to different exemplary embodiments. The baler comprises a bale chamber 100 which comprises a bottom wall 120 and a top wall 110. For the sake of completeness a plunger 180 of the baler is illustrated to indicate the plunger side of the baler. The plunger 180 is used for compressing crop material in the bale chamber 100. The baler, of which a part is illustrated in FIGS. 6A, 6B and 6C, has a so-called variable bend, wherein the top wall 110 comprises a movable top wall section 111b and a hinging top wall section 111a. Seen in a longitudinal direction of the baler, a first end of said hinging top wall section 111a is hingedly connected to a frame 150 of the baler at a plunger end of the bale chamber 100. A second end of said hinging top wall section 111a is hingedly connected to the movable top wall section 111b, such that the top wall 110 can have a slope discontinuity where the hinging top wall section 111a is connected to the movable top wall section 111b.

By having a top wall with variable bend 111a, 111b the bale chamber can be divided in a compressing zone delimited by section 111a, and a holding zone delimited by section 111b. If it is desirable to keep the section 111b parallel to the bottom wall 120, there may be pressed at two points on the section 111b. Because there is an additional hinge between the compression zone and the holding zone, it is preferred to press on at least two points. Although FIGS. 6A, 6B and 6C all illustrate embodiments wherein the movable top wall section 111b is kept parallel to the bottom wall 120, it is also possible, in case of the first position or starting position of the movable top wall section being under a certain angle with respect to the bottom wall, to keep the movable top wall section 111b under that angle with respect to the bottom wall while moving the movable top wall section to a position which is parallel to the first position or starting position.

FIG. 6A illustrates an embodiment wherein the positioning means 130 are configured for applying pressure to a first pressure point 112 and to a second pressure point 113 on the movable top wall section 111b such that the second position of the movable top wall section 111b is substantially parallel to the first position of the movable top wall section 111b. The first pressure point 112 and the second pressure point 113 are spaced apart by a distance along a longitudinal direction of the bale chamber. It is possible to place the movable top wall section 111b under a certain angle with respect to the bottom wall, if different pressures are applied to pressure points 112 and 113.

In the embodiment of FIG. 6C, two hydraulic cylinders 531, 532 are used as actuator means to apply pressure to the movable top wall section 111b. The first actuator means comprise a first hydraulic cylinder 531 which is attached to the frame 150 of the baler and arranged substantially perpendicular to the movable top wall section 111b. The first hydraulic cylinder 531 is configured for applying pressure to the first pressure point 112. The second actuator means comprise a second hydraulic cylinder 532 which is attached to the frame 150 of the baler and arranged substantially perpendicular to the movable wall section 111b. The second hydraulic cylinder 532 is configured for applying pressure to the second pressure point 113. A specific amount of pressure is applied to the first pressure point by the first hydraulic cylinder 531, while a specific amount of pressure is applied to the second pressure point 113 by the second hydraulic cylinder 531, resulting in placing the movable top wall section 111b in a substantially parallel position with the bottom wall 120. When the movable top wall section 111b needs to be placed under an angle, the first hydraulic cylinder 531 will need to apply more or less pressure to the first pressure point 112, and/or the second hydraulic cylinder 532 will need to apply more or less pressure to the second pressure point 113, when compared to the pressure applied in the parallel situation of the movable wall sections. Now the end of the movable top wall section 111b away from the plunger 180 will be pushed more or less inside the bale chamber 100 versus the front of the movable top wall section 111b.

In the embodiment of FIG. 6B, the coupling means comprise a rod 332 which is arranged substantially parallel to the movable top wall section 111b. The rod 332 is, at a first end 141, hingedly connected to a frame 150 of the baler and to a point on the movable top wall section 111b nearby the first pressure point 112. At a second end 142 the rod is hingedly connected to the frame 150 of the baler and to the second pressure point 113. The actuator means in FIG. 6B comprise a hydraulic cylinder 331 which is attached to the frame 150 of the baler and arranged substantially perpendicular to the movable top wall section 111b. The hydraulic cylinder 331 is configured for applying pressure to the first pressure point 112. In this embodiment, the movable top wall section 111b always remains parallel with the bottom wall.

When the rod 332 is replaced by an actuator such as a hydraulic cylinder (not shown), it is also possible to have the movable top wall section 111b to be placed under an angle. When the pressure is applied via hydraulic cylinder 331 to the first pressure point 112, the actuator 332 may be expanded such that the end of the top wall section 111b will be pushed inwards, thus clamping the formed bale more in the bale chamber compared to its parallel situation. If the actuator 332 is retracted, the end of the top wall section 111b will be pushed more outwardly, thus clamping the formed bale less compared to the parallel situation and allowing the formed bale to be pushed more easily out of the bale chamber.

Other possibilities resulting in the same effect are also possible, such as replacing the rods between the chassis 150, the top wall section 111b and/or the first 141 and/or second 142 hinge points by actuators.

In the above described embodiments and figures the wall positioning system has been illustrated, for the sake of simplicity, as having a linear configuration, wherein two pressure points 112, 113 on the movable wall section 111, 111b can be connected by an imaginary line along a longitudinal direction of the baler or bale chamber. It should be appreciated by the skilled person that according to alternative embodiments of the invention, the wall positioning system may comprise a plurality of such linear configurations, which are arranged substantially parallel to each other. In such embodiments there is not only pressed on two points positioned on an imaginary line in the longitudinal direction of the bale chamber, but also on at least two point positioned on an imaginary line in a lateral direction of the bale chamber. In such an exemplary embodiment the wall positioning system comprises two density belts, such that two belts apply pressure on the sections around the holding zone of a bale chamber. In a preferred embodiment the two belts can be coupled by providing coupling means which may comprise multiple rods 332 as mentioned in the embodiment of FIG. 3. An exemplary embodiment of a wall positioning system comprising two parallel linear configurations is shown in FIGS. 7A, 7B and 7C.

Figure 7A:
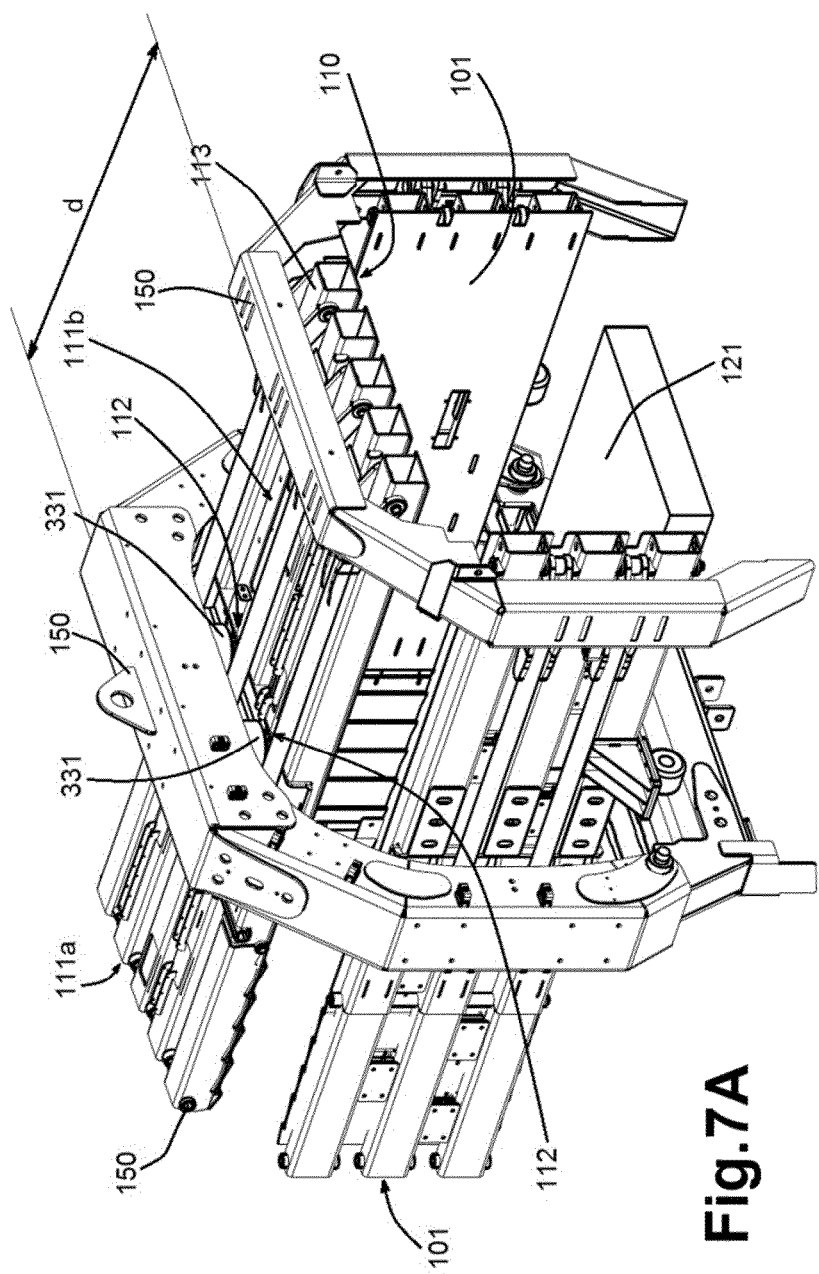
FIGS. 7A, 7B and 7C are drawings of a preferred exemplary embodiment of a wall positioning system for a rectangular baler, showing the wall positioning system in three different positions.

FIG. 7A illustrates an embodiment wherein the hinged top wall section 111a and the movable top wall section 111b are in line with each other. Also the side wall sections are shown in line with each other. In this position, comparable with position p1 of FIG. 1, the bale chamber 100 is in its widest position and the crop material is able to expand within this volume of the bale chamber. The hydraulic cylinders 331 are then completely retracted allowing the movable wall sections to be placed outwardly. Although the crop material in the bale chamber is pushing against the wall sections, it is preferred to have the hydraulic cylinders 331 to pull the doors outwardly. Also, a combination of the hydraulic cylinders and a spring arrangement is possible, thus assisting the hydraulic cylinders to pull the doors towards the position as illustrated in FIG. 7A.

Depending on the stroke of the hydraulic cylinders 331, it is even possible to place the hinged wall section 111a and the movable wall section 111b more outward, such that the hinged wall section 111a and movable wall section 111b are no longer substantially in line with each other, but present a slope discontinuity. This way the movable wall section (111b) is positioned more outward than the hinged wall section and the slope discontinuity defines an angle which is oriented opposite to the angle defined by the movable wall section and hinged wall section when pressure is applied to the movable wall section. Placing the movable wall section 111b more outward will result in even further increasing the cross section of the bale chamber.

Figure 7B:
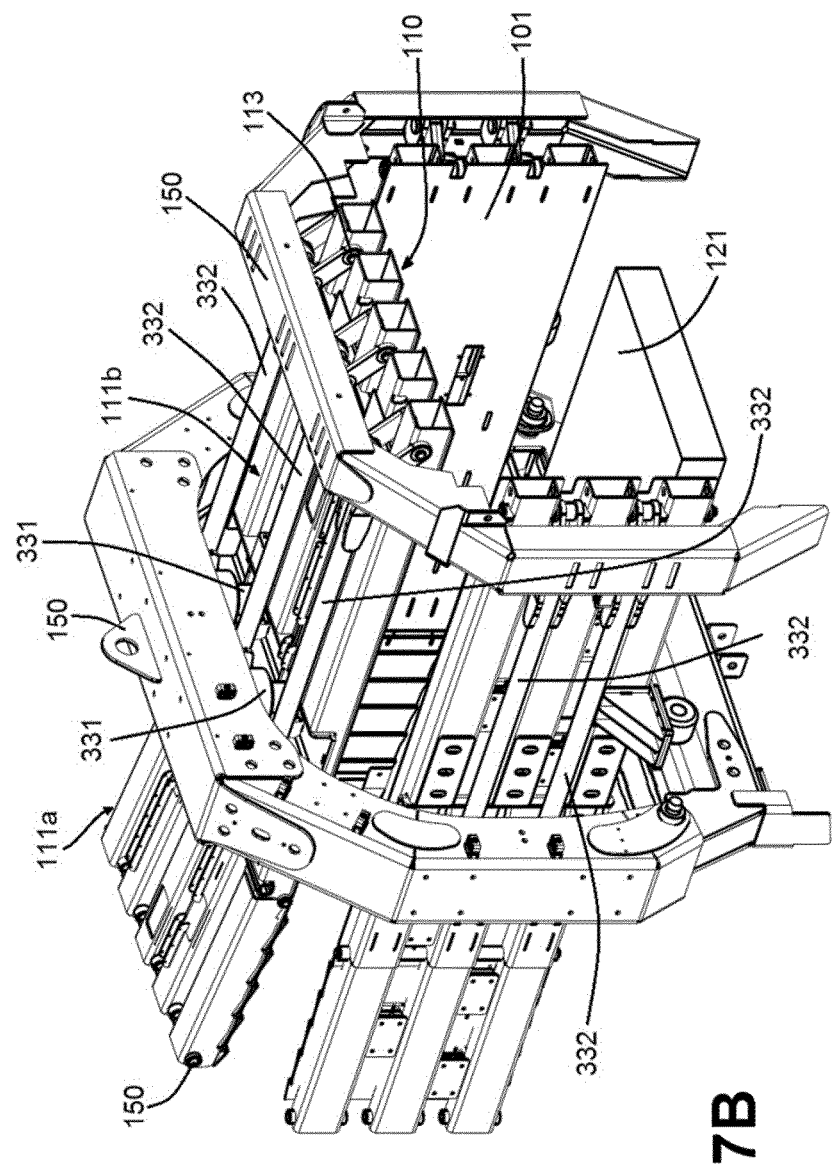
Figure 7C:
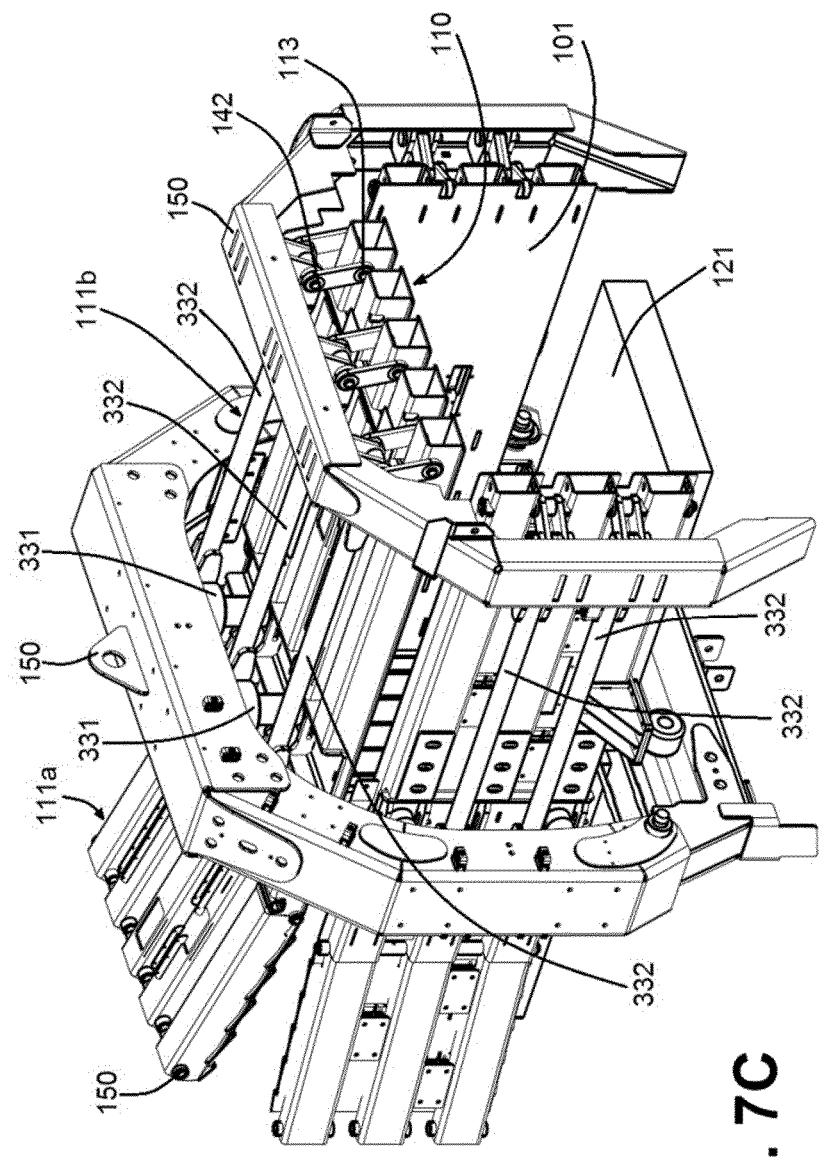

However, if more pressure needs to be applied to the crop material, such that a higher density of the crop material can be reached, the movable top wall section and/or side wall sections need to move more to the inside of the bale chamber 100, as is shown in FIG. 7B. Now, the hydraulic cylinders 331 are applying a force F on the first pressure point 112, pushing the movable top wall section 111b more to the inside of the bale chamber 100. The movement of the top wall section 111b will cause the hinge connections at the first end 141 of the rod 332 to expand. When the hinge connections at the first end 141 expand, they will cause the rod 332 to be pushed in the direction of the second end 142 of the rod 332. The movement of the rod 332 will then cause the hinge connections on the second end 142 to expand and consequently cause them to press on the second pressure point 113 of the movable wall section 111. The position of the movable top wall section 111b is a direct result of the amount of pressure applied by the hydraulic cylinders 331. Accordingly, the position of the movable side walls is a direct result of the amount of pressure applied on the movable side walls by the hydraulic cylinders 331. The same applies to the construction of the movable side walls.

FIG. 7C shows the movable wall sections in their maximum inward position in the bale chamber 100. In this position, comparable with position p2 of FIG. 1, the hydraulic cylinders 331 are extended at their maximum range.

The skilled person understands that embodiments of the wall positioning system may comprise more than two pressure points arranged on an imaginary line along a longitudinal direction of the bale chamber.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, hard drives, optically readable digital data storage media, etc.

The functions of the various elements shown in the figures, including any functional blocks labelled as "modules", may be provided through the use of dedicated hardware as well as hardware capable of executing software in association with appropriate software. Moreover, explicit use of the term "module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A rectangular baler having a wall positioning system, the baler comprising:
    a bale chamber comprising a plurality of walls including a movable wall section having an inward facing surface and an outward facing surface,
    a plunger positioned for movement within a forward portion of the bale chamber;
    wherein the wall positioning system comprises:
    a positioner for moving the movable wall section from a first position to a second position,
    wherein the positioner is configured for applying pressure to a first pressure point and to a second pressure point on the movable wall section such that the inward facing surface of the movable wall section in both the first and second position is parallel to an inward facing surface of an opposing side wall of the plurality of walls; and
    wherein the first pressure point and the second pressure point are spaced apart on the outward facing surface along a longitudinal direction of the bale chamber such that the second pressure point is rearward of the first pressure point along a length of the bale chamber;
    wherein the positioner comprises: an actuator for contacting and applying pressure directly to the first pressure point; and
    a coupler for providing a coupling between the first pressure point and the second pressure point, the coupler having a first end connected to a frame of the baler and to a point on the movable wall section near the first pressure point, and at a second end connected to the frame of the baler and to the second pressure point, wherein the first end and the second end are spaced apart along the longitudinal direction of the bale chamber.

2. The rectangular baler according to claim 1, wherein the coupler comprises a rod extending along the length of the bale chamber and which extends along the length of the movable wall section between the first and second pressure points, and the first and second ends hingedly connected to the frame.

3. The rectangular baler according to claim 2, wherein the wall positioning system further comprises a controlling unit configured for controlling the actuator to move the movable wall section to the second position.

4. The rectangular baler according to claim 1 wherein the actuator is attached to a frame of the baler and arranged such that it directly applies a force perpendicular to the movable wall section, wherein the actuator is configured for applying pressure to the first pressure point.

5. The rectangular baler according to claim 1, wherein the positioner further comprises:
 a first actuator for applying pressure to the first pressure point; and
 a second actuator for applying pressure to the second pressure point.

6. The rectangular baler according to claim 5, wherein the wall positioning system further comprises a controlling unit configured for controlling the first actuator and the second actuator to move the movable wall section to the second position.

7. The rectangular baler according to claim 5, wherein:
 the first actuator comprises a first hydraulic cylinder which is attached to the frame of the baler and arranged perpendicular to the movable wall section, wherein the first hydraulic cylinder is configured for applying pressure to the first pressure point; and
 the second actuator comprises a second hydraulic cylinder which is attached to the frame of the baler and arranged perpendicular to the movable wall section, wherein the second hydraulic cylinder is configured for applying pressure to the second pressure point.

8. The rectangular baler according to claim 1, wherein the movable wall section remains parallel to the opposing side wall as the movable wall section moves from the first position to the second position.

9. The rectangular baler according to claim 1, wherein the plurality of walls further comprises a bottom wall and a top wall, wherein the top wall comprises a movable top wall section and a hinging top wall section, and wherein, seen in a longitudinal direction of the baler, a first end of the hinging top wall section is hingedly connected to a frame of the baler at a plunger end of the bale chamber, and a second end of the hinging top wall section is hingedly connected to the movable top wall section, such that the top wall can have a slope discontinuity where the hinging top wall section is connected to the movable top wall section,
 wherein the movable top wall section is the movable wall section,
 wherein the positioner is configured for applying pressure to the first pressure point on the movable top wall section and to the second pressure point on the movable top wall section such that the second position of the movable top wall section is parallel to the first position of the movable top wall section, and
 wherein the first pressure point and the second pressure point are spaced apart along a longitudinal direction of the bale chamber.

10. The rectangular baler according to claim 1, wherein the plurality of walls further comprises a first side wall and a second side wall, wherein the first side wall comprises a movable side wall section and a hinging side wall section, and wherein, seen in a longitudinal direction of the baler, a first end of the hinging side wall section is hingedly connected to a frame of the baler at a plunger end of the bale chamber, and a second end of the hinging side wall section is hingedly connected to the movable side wall section, such that the first side wall can have a slope discontinuity where the hinging side wall section is connected to the movable side wall section,
 wherein the movable side wall section is the movable wall section,
 wherein the positioner is configured for applying pressure to the first pressure point on the movable side wall section and to the second pressure point on the movable side wall section such that the second position of the movable side wall section is parallel to the first position of the movable side wall section, and
 wherein the first pressure point and the second pressure point are spaced apart along a longitudinal direction of the bale chamber.

11. A wall positioning method for a rectangular baler comprising a bale chamber which comprises first and second side walls, the first and second side walls each comprising outer surfaces and facing inner surfaces forming boundaries of the bale chamber, wherein at least the first side wall is a movable wall section, wherein the wall positioning method comprises:
 moving the first side wall from a first position to a second position using a positioner by applying pressure to a first pressure point and to a second pressure point on the outer surface of the first side wall such that the inner surface of the first side wall in the first position and the second position is parallel to the inner surface of the opposing second side wall, and wherein the first pressure point and the second pressure point are spaced apart along a longitudinal direction of the bale chamber such that the second pressure point is rearward of the first pressure point along the length of the bale chamber, wherein the positioner comprises: an actuator for contacting and applying pressure directly to the first pressure point and a coupler for providing a coupling between the first pressure point and the second pressure point, the coupler having a first end connected to a frame of the baler and to a point on the first side wall near the first pressure point, and at a second end connected to the frame of the baler and to the second pressure point, wherein the first end and the second end are spaced apart along the longitudinal direction of the bale chamber.

12. The wall positioning method according to claim 11, wherein the coupler comprises a rod extending along a length of the bale chamber, which is arranged parallel to the first side wall.

13. The wall positioning method according to claim 11, wherein moving the movable wall section from the first position to the second position comprises:
 directly applying pressure to the first pressure point; and
 directly applying pressure to the second pressure point.

14. The wall positioning method according to claim 11, wherein pressure is applied to the first pressure point and the second pressure point such that the first side wall remains parallel to the second side wall when moving between the first position and the second position.

* * * * *